Feb. 11, 1969  J. S. HALPERIN  3,426,864
SEAT BELT CONTROLLED MOTOR STARTER SYSTEM
Filed Nov. 29, 1966  Sheet 1 of 2

INVENTOR
JACK S. HALPERIN
by: Wallenstein, Spangenberg, Hattis & Strampel
ATTYS.

INVENTOR
JACK S. HALPERIN by: Wallenstein, Spangenberg, Hattis
& Strampel ATTYS

United States Patent Office 3,426,864
Patented Feb. 11, 1969

3,426,864
SEAT BELT CONTROLLED MOTOR
STARTER SYSTEM
Jack S. Halperin, 2820 W. Glen Lake Ave.,
Chicago, Ill. 60645
Filed Nov. 29, 1966, Ser. No. 597,772
U.S. Cl. 180—82
Int. Cl. B60k 27/00
1 Claim

ABSTRACT OF THE DISCLOSURE

An interlock system for preventing starting of an automobile motor when a seat belt is not properly applied around the driver, the interlock system including a first motor start inhibiting switch having an initial position for normally preventing the starting of the motor on actuation of he motor start swich from an initial stable starting position to a second unstable force maintained position which is maintained only when the seat belt is pulled into and held in a position where the tension therein would normally indicate that the belt is secured around the driver, and a second motor start inhibiting switch having a manually-operable control means positioned opposite the driver's seat to be actuated by the hand of the driver while sitting upright in his seat other than the hand used to operate the motor start switch, the second motor start inhibiting switch having a stable normal position for preventing the starting of the motor and a second unstable manual force maintained position which is maintained only by application of manual force on the associated manually-operable control means.

The present invention relates to a unique motor starter control apparatus for use in conjunction with seat belt installations in automobiles, trucks and the like, wherein the motor of the vehicle involved cannot be started until the driver applies his seat belt around his body.

Atlhough it is generally recognized that serious bodily injury from motor vehicle accidents is frequently avoided by using seat belts for anchoring the driver and his passengers in place, it is surprising that seat belt installations in such vehicles are frequently unused by the driver and his passengers. Generally, when the driver uses his seat belt passengers will do likewise.

One scheme heretofore proposed for forcing the driver to apply his seat belt involves the inclusion of conductors for the motor starter circuit in the separable sections of the driver's seat belt, the wires being electrically connected through the engaging sections of the seat belt buckle so the starter motor cannot be energized until the driver buckles the two sections of his seat belt together. The safety feature of this seat belt system can be simply circumvented by the driver before he is seated in the driver's seat by buckling the belt sections together and leaving the same lying on the seat. This seat belt system has the disadvantage that there are hazards to the driver from shock and sparking where the wiring in the seat belt is or becomes defective, since current flows through exposed metal parts passing close to the driver's body. These hazards are eliminated by replacing the wiring in the belt by a tension responsive switch which is connected to one of the sections of the seat belt at a point far removed from the user's body, such as near the floor where the end of the seat belt section is anchored in place, the switch unit being actuated when the belt is snugly applied around the user's body where the belt is under appreciable tension. The switch unit prevents energization of the starter motor except when the switch unit is actuated by the presence of tension in the belt section to which it is connected normally indicating that the belt sections are secured around the driver. However, the purpose of this switch unit readily can be circumvented since the driver can apply tension in the belt section to which the switch unit is connected simulating the condition where the belt sections are applied around the driver's body by simply pulling the seat belt section with one hand without buckling the seat belt sections while the starter switch is operated with the other hand.

The present invention is an improvement upon the motor start control system described above, where a switch unit is provided which prevents the starting of the motor until one of the belt sections is under a tension which normally indicates that the belt sections are secured around the driver in that the driver cannot simulate a buckled condition of the seat belt while starting the motor by pulling on the seat belt. The operation of the invention is predicated on the fact that the starting operation of most motor vehicles requires the manual actuation of a key-operated switch or the like by one of the hands of the driver. The invention adds a manually operable switch which must be operated by the other hand of the driver with the key-operated switch to start the motor so that the driver does not have a free hand to apply tension to one of the sections of the belt to actuate the seat belt switch unit.

The most preferred form of the invention is designed so that it can be readily incorporated in conventional existing seat belt arrangements.

The above and other features and advantages of the invention will become apparent upon making reference to the specification, the claims and the drawings wherein:

Figure 1:
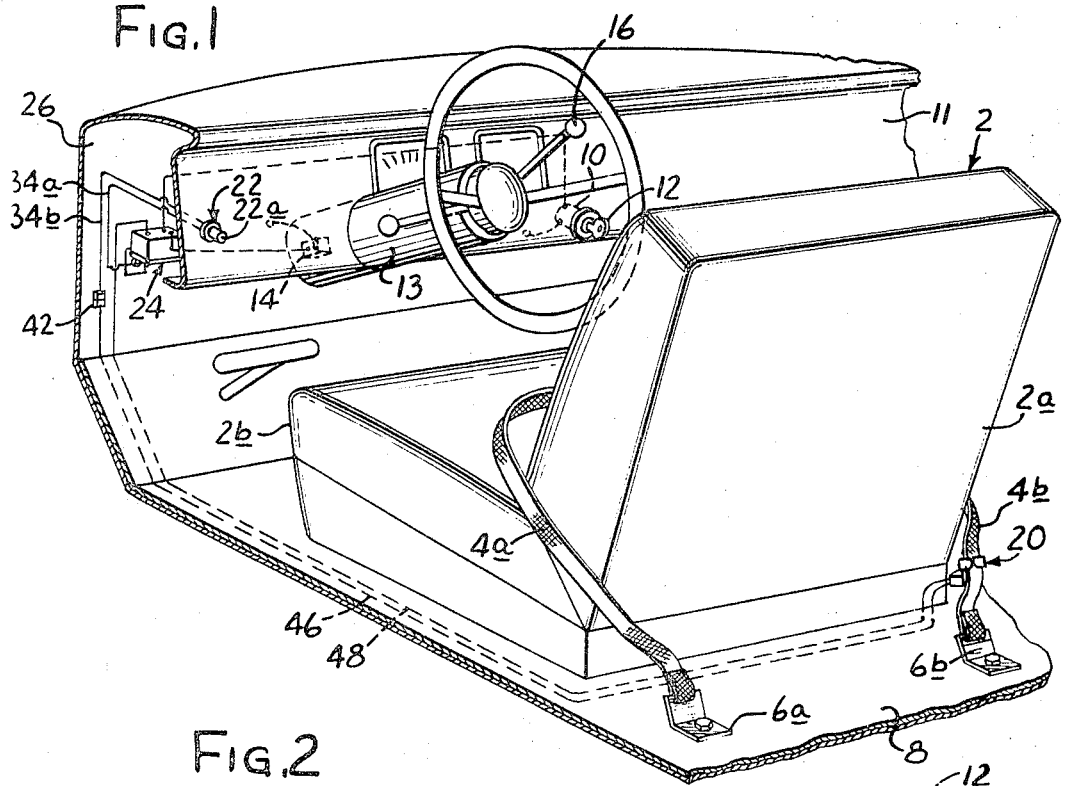
FIG. 1 is a perspective view of an automobile driver's seat belt, dashboard and exemplary motor start control apparatus of the invention associated therewith.

FIG. 1 shows a driver's seat 2 with the usual backrest portion 2a and seat portion 2b. A seat belt assembly is shown having left and right seat belt sections 4a and 4b securable together around the driver by a suitable buckle arrangement (not shown). The inner ends of the illustrated seat belt sections are suitably connected to brackets 6a and 6b which, in turn, are anchored to the floor 8 of the automobile in the usual manner. (Although FIG. 1 illustrates a seat belt assembly of the non-retractable type, it should be understood that the present invention can be equally applicable to a seat belt assembly with a retractable seat belt section.) The automobile illustrated further includes the well known key-operable motor starter switch 10 mounted on the dashboard 11 and adapted to receive a key 12 which is inserted into a tumbler-containing slot forming part of the starter switch 10 and then rotated into an extreme position during a motor starting operation. When the key or manually operable control means 12 for the motor start switch 10 is released it automatically assumes an intermediate position which maintains the ignition circiut of the automobile in energized condition. The automobile illustrated herein also includes what is sometimes referred to as a neutral switch 14 mounted on the steering wheel tube 13 behind the dashboard 11. The neutral switch usually includes a pair of contacts which are closed when the shift level 16 is in a "neutral" or "park" position and are open for the other positions of the lever.

Figure 3:
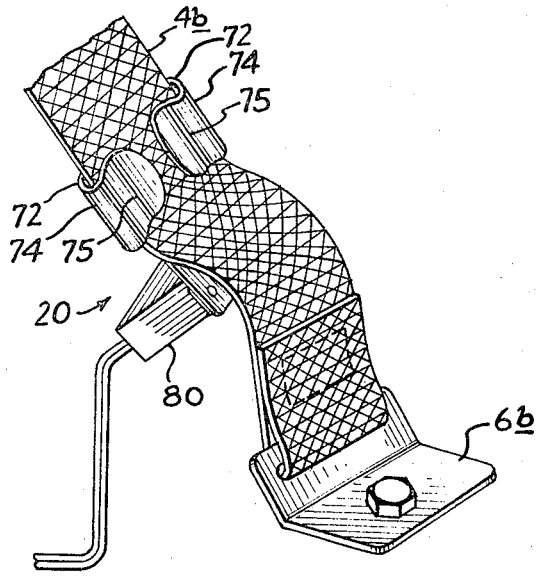
FIG. 3 is a perspective view showing the manner in which the switch unit forming part of the assembly of FIG. 2 is applied to a section of the seat belt.
Figure 4:
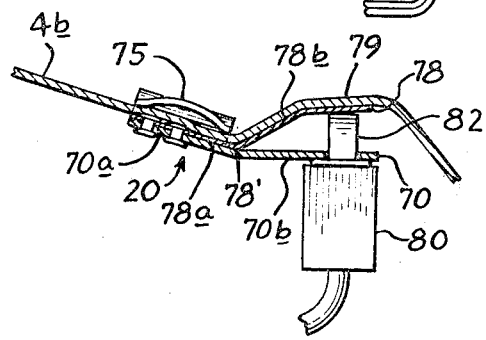
FIG. 4 is a sectional view through the switch unit and belt section shown in FIG. 3.

As will appear, a seat belt condition responsive switch unit 20 and a manually operable motor start inhibiting switch unit 22 are provided which are connected into a control circuit for the starter motor of the automobile. The belt condition responsive switch unit 20 is most advantageously (but not necessarily) a switch unit adapted to be mounted directly on the flexible web portion of the seat belt section 4a or 4b as best shown in FIG. 3 or 4 and described later on in the specification. Such a belt swituh unit is described and claimed in U.S. Patent No. 3,343,622 granted to Edward C. Maurer. However, the present invention is useful with any switch unit which is operated by pulling of the associated belt section into a position where the tension in the belt normally indicates that the belt is secured around the driver's body. (In the retractable type of seat belt arrangement, the switch unit 20 could be modified to operate with the retractable seat belt section. In such case, where the retractable belt section is held under spring tension in a roll, the switch unit could be modified to be responsive directly to the length of the belt section unwound or withdrawn from the roll. Even in such an embodiment, the switch unit can be said to be actuated when the belt is under a tension normally indicating that the belt is secured around the driver's body.) The belt responsive switch unit 20 to be described has the advantage that it can be used with almost any seat belt arrangement having at least one non-retractable belt section, and it can be installed by the simple expedient of mounting the switch unit directly on the belt section involved adjacent to the point at which the belt section is anchored to the floor bracket of the vehicle, as best shown in FIGS. 3 and 4.

As previously indicated, the switch unit 20 is wired into a control circiut for the starter motor of the vehicle in a manner so that the motor cannot be started unless the belt section to which the switch unit is connected is pulled into a position where the belt has a tension or a position normally indicating that the belt section is secured around the driver's body. The manually operable switch unit 22 is provided with connections into the control circuit for the starter motor so the manually operable switch unit 22 must be operated by one of the driver's hands while his other hand simultaneously operates the starter switch to start the motor, so the driver does not have a hand free to pull on the belt section with which the belt condition responsive switch unit 20 is associated. Thus, to start the automobile motor the belt sections 4a and 4b must first be secured around the driver's body before the starter switch 10 and the manually operable switch unit 22 can be operated to start the motor. As is conventional with most automobiles, to start the motor also requires that the shift level 16 be in a "neutral" or "park" position.

Figure 5:
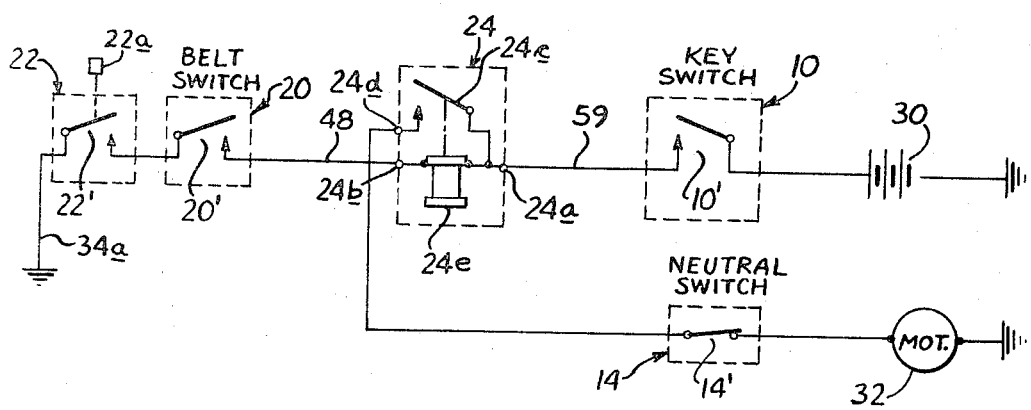
FIG. 5 is an electrical circuit diagram of the exemplary motor start control circuit formed by the apparatus of FIG. 2.

In the present invention, it is most advantageous to operate the starter motor through contacts of a relay. Accordingly, a relay unit 24 is shown mounted on the fire wall 26 of the automobile. The manually operable switch unit 22 is most advantageously mounted on the dashboard 11 to the left of the steering column when the starter switch 10 is mounted to the right thereof as illustrated. FIG. 5 shows the most preferred form of motor start control circuit in which the various aforementioned switch and relay units are connected. As there shown, one terminal of a storage battery 30 and a starter motor 32 are grounded to the automobile frame.. The other terminal of the storage battery 30 in the illustrated embodiment of the invention is connected to one of the terminals of a pair of normally-open contacts 10' of the motor starter switch 10, the other terminal of which is connected to one of the terminals 24a of the coil 24e of the relay unit 24 is connected through a pair of normally-open contacts 20' of the belt condition responsive switch unit 20. The normally-open pair of contacts 20' are connected to ground through a pair of normally-open contacts 22' of the manually operable switch unit 22.

The contacts 10' of the motor starter switch 10 are closed when the key 12 is turned momentarily to one extreme position thereof. The contacts 20' of the belt condition responsive switch unit 20 are closed when the belt section 4b with which the switch unit 20 is associated is pulled into a position indicating that the belt section is ostensibly secured around the driver's body and the contacts 22' of the manually operable switch unit 22 are closed when a pushbutton or other control member 22a exposed on the front side of the dashboard 11 is operated momentarily by the driver during the motor starting operation. When the contacts 10', 20' and 22' referred to are simultaneously closed, the relay 24 is energized to close a normally open set of relay contacts 24c establishing an energization circuit for the starter motor 32 including normally-closed contacts 14' of the neutral switch 14, if the shift lever 16 is in a "neutral" or "park" position.

Figure 2:
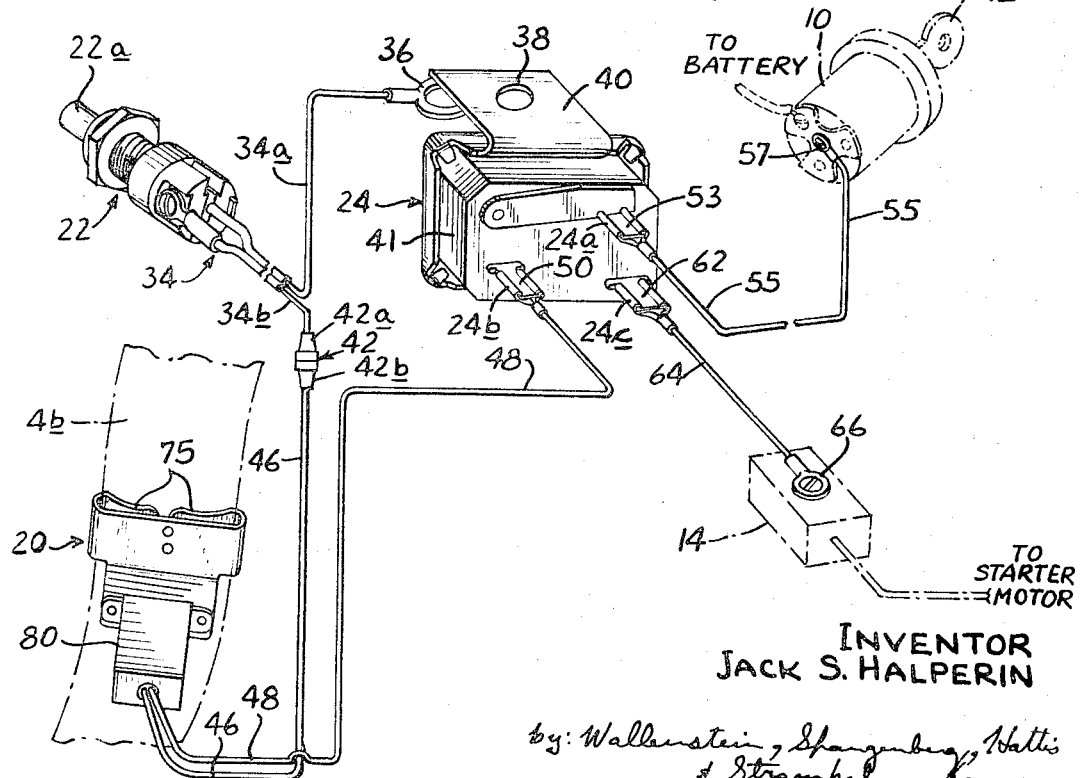
FIG. 2 shows in solid lines the various components of FIG. 1 which are sold as a kit for incorporation in a used automobile, the dashline portions of the figure showing the various parts of the automobile with which the various components of the kit are connected.

The various components making up the illustrated form of the invention to be connected to the seat belt sections 4a–4b, motor starter switch 10 and the neutral switch 14 are assembled into a kit so that they can be installed with a minimum of effort and expense. FIG. 2 shows in solid lines the various components making up the exemplary kit of the present invention. The manually operable switch unit 22 has a two conductor cable 34 extending therefrom, the cable separating into an insulated cable section 34a terminating in an eyelet 36 adapted to be grounded to the body of the automobile by any suitable means, such as by a screw, bolt or the like passing through the eyelet 36 and also through an opening 38 in a bracket 40 of the housing 41 of the relay unit 24. The bracket 40 is utilized to anchor the relay unit to the fire wall 26 or other metal part of the automobile. The cable 34 has another insulated section 34b which terminates in an insulated connector section 42a of a connector 42 having a terminal (not shown) which fits into or around an insulated connector section 42b of the connector 42. An insulated conductor 46 extending from the connector section 42b extends into the belt condition responsive switch unit 20 where it makes connection with a terminal of one of the pair of contacts 20' thereof (not shown in FIG. 2.) Another insulated conductor 48 extends from the terminal of the other contact of the pair of contacts 20' of the switch unit 20. The conductor 48 terminates in a blade terminal 50 which slides into a guide channel 24b projecting from the housing 41 of the relay unit 24 and forming one of the terminals of the coil 24e of the relay unit 24. (Most of the conductors and terminals shown in FIG. 2 are identified by corresponding reference numerals in FIG. 5.)

The housing 41 of the relay unit 24 has another guide channel 24a into which a blade terminal 53 of an insulated conductor 55 extends. The conductor 55 terminates in a terminal 57 connectible to one of the terminals of the starter switch 10. The housing 41 of the relay unit 24 also has a slide channel 24c projecting therefrom and forming a terminal for a blade terminal 62 connected to the end of an insulated conductor 64 whose other end carries a suitable terminal 66 for connection to one of the terminals of the neutral switch 14.

As above indicated, the belt condition responsive switch unit 29 can have a variety of forms. The switch unit 20 illustrated in the drawings is preferred because of its simplicity and the ease with which it can be mounted upon the belt section 4a. The switch unit 20 includes a mounting plate 70 (FIG. 4) provided with a pair of laterally extending arms 72—72 at one end 70a thereof which are reversely bent at 74—74 to form seat belt engaging members 75—75 which overlie one side of the belt section 4b. The seat belt section engaging members 75—75 terminate in spaced relation and the arms are sufficiently resilient to hold the seat belt section 4b in contact with the base portion 78a of a spring member 78 anchored to the mounting plate 70.

The spring member 78 is preferably in the form of a leaf spring which has an end portion 78b which angles away from the end portion 70b of the mounting plate 70 so as to form a kink 79 in the belt section 4b as best shown in FIG. 4.

The switch unit 20 includes a switch housing 80 which is secured to the end portion 70b of the mounting plate 70, the switch housing including the aforementioned pair of normally-open contacts 20'. The contacts 20' are preferably urged by springs or other means (not shown) to their open position. A plunger 82 extends from one of the contacts 20' and projects through the housing 80 into a position adjacent the end portion 78b of the spring member 78. When there is no tension in the belt section 4a, the plunger 82 remains in a fully extended position where the contacts are opened. When, however, the belt section 4a is placed under a given tension including that the belt section is normally applied around the driver's body, the belt section 4a will tend to straighten out and the tension in the belt will flex the end portion 78b of the spring member 78 to apply an inward force against the plunger 82 which when there is the desired tension in the belt section 4a, will close the contacts 20'.

It is apparent that the advantages of the invention are due primarily to the inclusion of the manually operable switch unit 22 which must be operated by one hand while the other hand operates the starter switch 10 during starting of the motor so that it is difficult for the driver to circumvent the attachment of the seat belt sections together around the driver's body in order to start the motor.

I claim:
1. In a motor vehicle having a motor start circuit for controlling the operation of said motor, a driver's seat, means for starting said motor including a key operated motor start switch having a first manually operable control means positioned opposite the driver seat to be momentarily manually actuated by one of the hands of the driver for starting the motor while sitting upright in his seat, said motor start switch having a normal stable inoperative position and an unstable force maintained start position which is maintained only by application of manual force on said first manually operable control means whereby, when the normal force applied by the operator is removed from the control means, the switch moves away from said start position, a seat belt assembly at said driver's seat including separable seat belt sections and buckling means for securing together the seat belt sections around the driver, the seat belt sections being then placed under tension, the improvement in means for preventing the starting of said motor before attachment of said seat belt sections around the driver comprising: a belt operated motor start inhibiting switch connected to said seat belt and having an initial position for normally preventing the starting of said motor upon actuation of said motor start switch to said start position and a second force maintained position which is maintained only when at least one of the belt sections is pulled into a position where the tension in the belt section would normally indicate that the belt sections are secured around the driver, and a second motor start inhibiting switch having a second manually hand operable control means positioned opposite the driver's seat readably accessible to and actuable by the other hand of the driver while sitting upright in his seat, said second motor start inhibiting switch having a stable normal position for preventing the starting of the motor upon actuation of said motor start switch to said start position and a second unstable force maintained position for enabling the motor to be started by said motor start switch and which is maintained only by application of manual force on the latter manually operable control means whereby, when the manual force applied by the operator is removed from the second manually operable control means, said second motor start inhibiting switch moves away from said second unstable position, and means connecting said motor start switch and said first and second motor start inhibiting switches into said motor start circuit so the motor starts only when said motor start switch is in said unstable force maintained start position and said first and second motor start inhibiting switches are in their second force maintained positions.

References Cited

UNITED STATES PATENTS

| | | | |
|---|---|---|---|
| 3,185,246 | 5/1965 | Maurer | 180—82 |
| 3,340,523 | 9/1967 | Whitman | 180—82 |
| 3,343,622 | 9/1967 | Maurer | 180—82 |

A. HARRY LEVY, *Primary Examiner.*